United States Patent
Huang et al.

(10) Patent No.: US 9,641,087 B2
(45) Date of Patent: May 2, 2017

(54) METHOD AND DEVICE FOR DETECTING CONDUCTION MODE

(71) Applicant: SYNC POWER CORP., Taipei (TW)

(72) Inventors: Chun-Jen Huang, Taipei (TW); Hsian-Pei Yee, Taipei (TW)

(73) Assignee: SYNC POWER CORP., Taipei (TW)

( * ) Notice: Subject to any disclaimer, the term of this patent is extended or adjusted under 35 U.S.C. 154(b) by 37 days.

(21) Appl. No.: 14/823,426

(22) Filed: Aug. 11, 2015

(65) Prior Publication Data

US 2017/0047851 A1    Feb. 16, 2017

(51) Int. Cl.
*H02M 3/335*    (2006.01)
*H02M 1/00*    (2006.01)

(52) U.S. Cl.
CPC ... *H02M 3/33515* (2013.01); *H02M 3/33592* (2013.01); *H02M 2001/0009* (2013.01)

(58) Field of Classification Search
CPC .................................. H02M 3/33592
See application file for complete search history.

(56) References Cited

U.S. PATENT DOCUMENTS 6,456,106 B1 *    9/2002    Yee .................. H02M 3/33523
                                                               324/764.01

* cited by examiner

*Primary Examiner* — Harry Behm
(74) *Attorney, Agent, or Firm* — Muncy, Geissler, Olds & Lowe, P.C.

(57) ABSTRACT

A method and a device for detecting conduction mode is disclosed. The method uses an energy-storing element to connect with a synchronous rectifier and a load, and the load connects with the synchronous rectifier. Firstly, energy is discharged from the energy-storing element and applied to the load through the synchronous rectifier to periodically generate a detected voltage signal across the synchronous rectifier, and the detected voltage signal comprises at least one raising waveform, at least one horizontal waveform and at least one descending waveform. Then, an output is generated according to waveform of the detected voltage signal and either of a reference duration or a reference slope, so as to determine that the energy-storing element operates in CCM or DCM.

19 Claims, 11 Drawing Sheets

METHOD AND DEVICE FOR DETECTING CONDUCTION MODE

BACKGROUND OF THE INVENTION

Field of the Invention

The present invention relates to a detection technology, particularly to a method and a device for detecting conduction mode.

Description of the Related Art

Switching power converters with synchronous rectification utilize switching between inductor's current continuous and discontinuous conduction operation modes (CCM and DCM) in order to achieve improved power efficiency across wide load and input voltage ranges. The inductor current zero crossing is sensed in order to detect the operation modes transition point between CCM and DCM. The challenges associated with this include inductor current zero crossing point sensing accuracy, noise effect near the zero crossing point and the sensing circuitry speed and power loss.

While synchronous rectification is used in switching power converters in order to improve the power efficiency at high load currents in addition to reducing the output voltage ripple, transitioning from CCM to DCM at lighter load currents is used in order to improve light load power efficiency. Switching from CCM to DCM or vice versa requires sensing the zero crossing of the inductor current. This requires sensing the instantaneous inductor current information at the switching frequency speed, its accuracy and stability is sensitive to noise effect at the zero crossing transition point and it results in additional power losses by the sensing circuitries especially at higher load currents and at higher switching frequencies. The detection of the inductor current zero crossing, which determines the operation mode (CCM or DCM) and determines the Synchronous Rectifier (SR) switch turn off time in DCM, requires sensing the instantaneous current of the output inductor, where the high bandwidth sensing and detection circuitries are essential in order to detect the correct zero crossing point. Moreover, the switching noise, which is introduced at the instances of turning ON and OFF of the converter switches (where the zero crossing of inductor current occurs), makes it more difficult to detect the zero crossing time (and the non zero crossing) accurately.

To overcome the abovementioned problems, the present invention provides a method and a device for detecting conduction mode, so as to solve the afore-mentioned problems of the prior art.

SUMMARY OF THE INVENTION

A primary objective of the present invention is to provide a method and a device for detecting conduction mode, which uses a reference duration and two different voltages of a detected voltage signal across a synchronous rectifier to detect the waveform slope of the detected voltage signal, thereby precisely determining that an energy-storing element operates in continuous conduction mode (CCM) or discontinuous conduction mode (DCM).

To achieve the abovementioned objectives, the present invention provides a method for detecting conduction mode, which uses an energy-storing element to connect with a synchronous rectifier and a load, and the load connects with the synchronous rectifier. Firstly, energy is discharged from the energy-storing element and applied to the load through the synchronous rectifier, so as to periodically generate a detected voltage signal across the synchronous rectifier, and the detected voltage signal comprises at least one raising waveform, at least one horizontal waveform and at least one descending waveform appearing during a period of the detected voltage signal. Then, the detected voltage signal is received to generate an output according to the detected voltage signal, and either of a reference duration or a reference slope, so as to determine that the energy-storing element operates in CCM or DCM.

The present invention also provides a device for detecting conduction mode, which connects with a synchronous rectifier, and the synchronous rectifier and a load connect with an energy-storing element, and the load connects with the synchronous rectifier. Energy is discharged from the energy-storing element and applied to the load through the synchronous rectifier, so as to periodically generate a detected voltage signal across the synchronous rectifier. The detected voltage signal comprises at least one raising waveform, at least one horizontal waveform and at least one descending waveform appearing during a period of the detected voltage signal. The device for detecting conduction mode receives the detected voltage signal, and generates an output according to the detected voltage signal, and either of a reference duration or a reference slope, so as to determine that the energy-storing element operates in CCM or DCM.

Below, the embodiments are described in detail in cooperation with the drawings to make easily understood the technical contents, characteristics and accomplishments of the present invention.

DETAILED DESCRIPTION OF THE INVENTION

Figure 1:
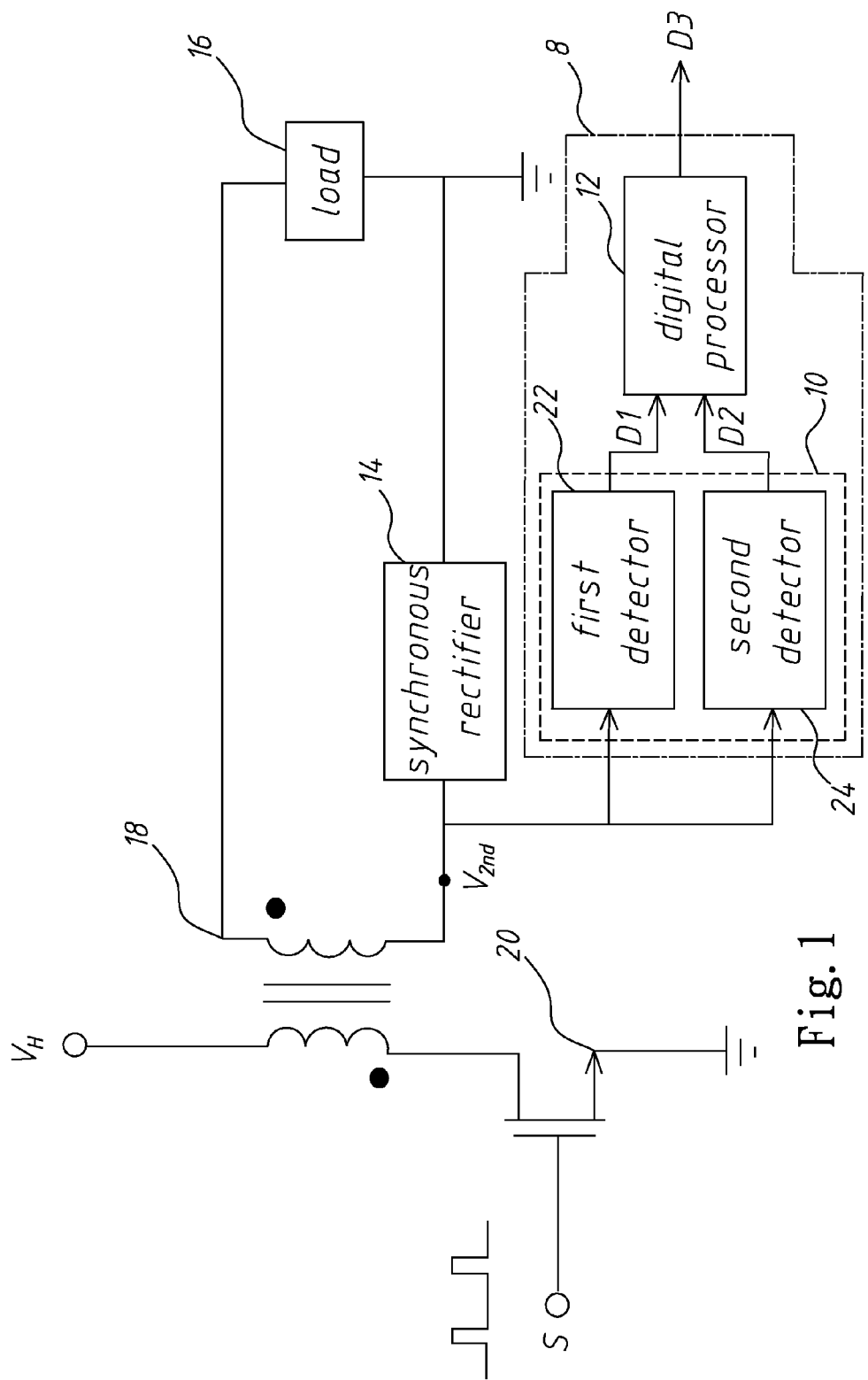
FIG. 1 is a schematic diagram illustrating a device for detecting conduction mode according to the first embodiment of the present invention.

The present invention provides a conduction mode detection technique whose goal is to detect continuous conduction mode (CCM) and discontinuous conduction mode (DCM).

CCM indicates that an energy-storing element, such as a power transformer connected with a rectifier, is always conducting current and has two states of receiving energy from input and delivering energy to the output. In CCM, the voltage across the rectifier is a square wave. When receiving energy, the voltage across the rectifier is high related to the input voltage. When delivering energy, the voltage across the rectifier is near zero.

DCM indicates that the power transformer still has two states of receiving energy from input and delivering energy to the output. When receiving energy, the voltage across the rectifier is high related to the input voltage. When delivering energy, the voltage across the rectifier is near zero. In DCM, the voltage across the rectifier is not a square wave, and the voltage across the rectifier oscillating at a frequency determined by parasitic inductance and capacitance occurs.

The present invention uses a circuit to detect the difference between CCM and DCM, namely, by detecting the voltage across the rectifier. The oscillation voltage in DCM has a lower rise and fall time than the square wave. This circuit uses a rise/fall time detection to distinguish CCM from DCM. Another possible method is to use a filter circuit, since the square wave in the states of receiving and delivering energy have a faster rise/fall time and/or higher frequency than the oscillation voltage.

Refer to FIG. 1, FIG. 2, FIG. 3, FIG. 4 and FIG. 5, and the first embodiment of the present invention is introduced as below. The device 8 for detecting conduction mode comprises an analog processor 10 and a digital processor 12. The digital processor 12 is realized with a logic assembly, such as a XOR gate. The analog processor 10 connects with a synchronous rectifier 14, wherein the synchronous rectifier 14 is realized with a diode or an N-channel metal oxide semiconductor field effect transistor (NMOSFET). An energy-storing element, for example, but not limited to a transformer 18 or an inductor, connects with the synchronous rectifier 14 and a load 16 including a load capacitance. In the first embodiment, for example, the transformer 18 is installed in a switching power supply. A secondary winding of the transformer 18 and the load 16 connects with the synchronous rectifier 14. An end of a primary winding of the transformer 18 connects with a high-voltage terminal, and another end of the primary winding connects with a low-voltage terminal via an electrical switch 20. For example, the low-voltage terminal is grounded and the electrical switch 20 is realized with an NMOSFET. The electrical switch 20 receives a square waveform S to switch a conduction state thereof, and the transformer 18 receives and stores a voltage $V_H$ as energy from the high-voltage terminal and discharges the energy from the secondary winding according to the conduction state.

The energy is applied to the load 16 through the synchronous rectifier 14, so as to periodically generate a detected voltage signal $V_{2nd}$ across the synchronous rectifier 14. The waveform of the detected voltage signal $V_{2nd}$ comprises at least one raising waveform, at least one horizontal waveform and at least one descending waveform appearing during a period T of the detected voltage signal $V_{2nd}$. The raising waveform, the horizontal waveform and the descending waveform appear during different intervals. The analog processor 10 receives the detected voltage signal $V_{2nd}$, and generates first and second digital signals D1 and D2 according to the waveform and voltage of the detected voltage signal $V_{2nd}$ and a reference duration. For example, the voltage of the detected voltage signal $V_{2nd}$ comprises and first, second and third voltages $V_1$, $V_2$ and $V_3$ between the maximum voltage and the minimum voltage of the detected voltage signal $V_{2nd}$, and the second voltage $V_2$ is less than the first voltage $V_1$. In the first embodiment, for example, the first voltage $V_1$ is equal to the third voltage $V_3$. Alternatively, the analog processor 10 generates first and second digital signals D1 and D2 according to the waveform of the detected voltage signal $V_{2nd}$ and a reference slope. The digital processor 12 connects with the analog processor 10, receives the first and second digital signals D1 and D2, and generates a third digital signal D3 as an output according to the first and second digital signals D1 and D2, so as to determine that the transformer 18 operates in continuous conduction mode (CCM) or discontinuous conduction mode (DCM). When the transformer 18 operates in CCM, the third digital signal D3 is a single level digital signal. When the transformer 18 operates in DCM, the third digital signal D3 has two different voltage levels or an inverse single level digital signal of CCM. Since the waveform slope of the detected voltage signal $V_{2nd}$ are different in DCM and CCM, the third digital signal D3 can precisely distinguish CCM from DCM.

The analog processor 10 further comprises a first detector 22 and a second detector 24. The first and second detectors 22 and 24 can be realized with SR latches or J-K flip flops. The first detector 22 connects with the synchronous rectifier 14 and the digital processor 12, receives the detected voltage signal $V_{2nd}$, and generates the first digital signal D1 according to the waveform of the detected voltage signal $V_{2nd}$, the reference duration, the first voltage $V_1$ and the second voltage $V_2$. Alternatively, the first detector 22 generates the first digital signal D1 according to the waveform of the detected voltage signal $V_{2nd}$ and the reference slope. The second detector 24 connects with the synchronous rectifier 14 and the digital processor 12, receives the detected voltage signal $V_{2nd}$, and generates the second digital signal D2 according to the waveform of the detected voltage signal $V_{2nd}$, the reference duration and the first, second and third voltages $V_1$, $V_2$ and $V_3$. Alternatively, the second detector 24 generates the second digital signal D2 according to the waveform of the detected voltage signal $V_{2nd}$ and the reference slope.

Figure 2:
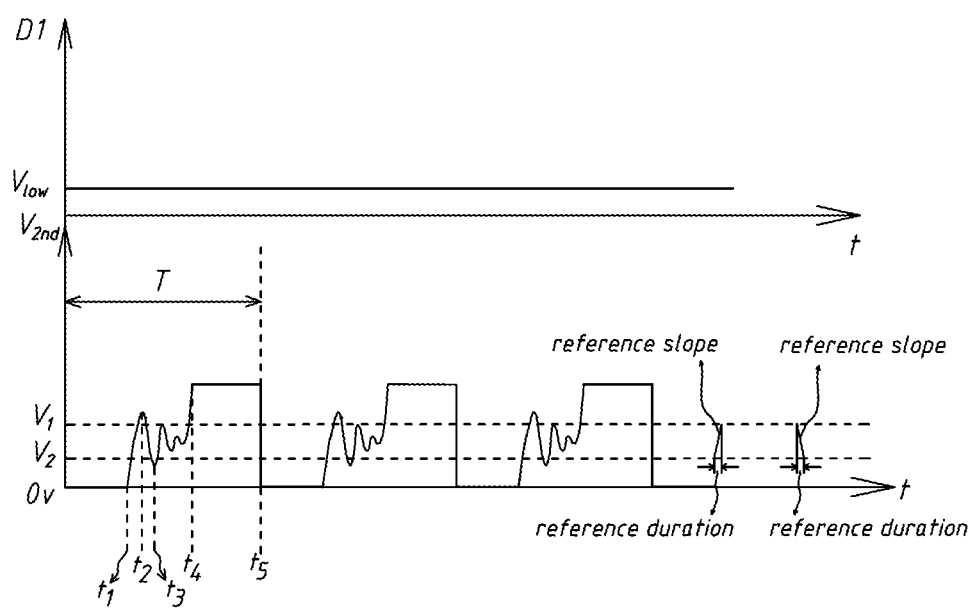
FIG. 2 is a schematic diagram illustrating waveforms of a detected voltage signal and the first digital signal in discontinuous conduction mode (DCM) according to the first embodiment of the present invention.
Figure 3:
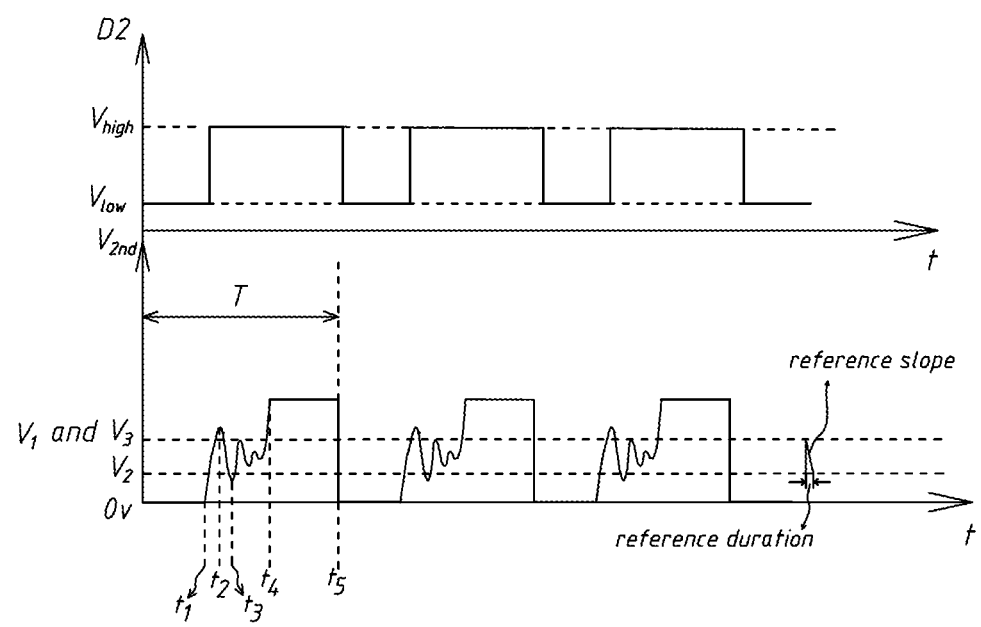
FIG. 3 is a schematic diagram illustrating waveforms of the detected voltage signal and the second digital signal in DCM according to the first embodiment of the present invention.
Figure 4:
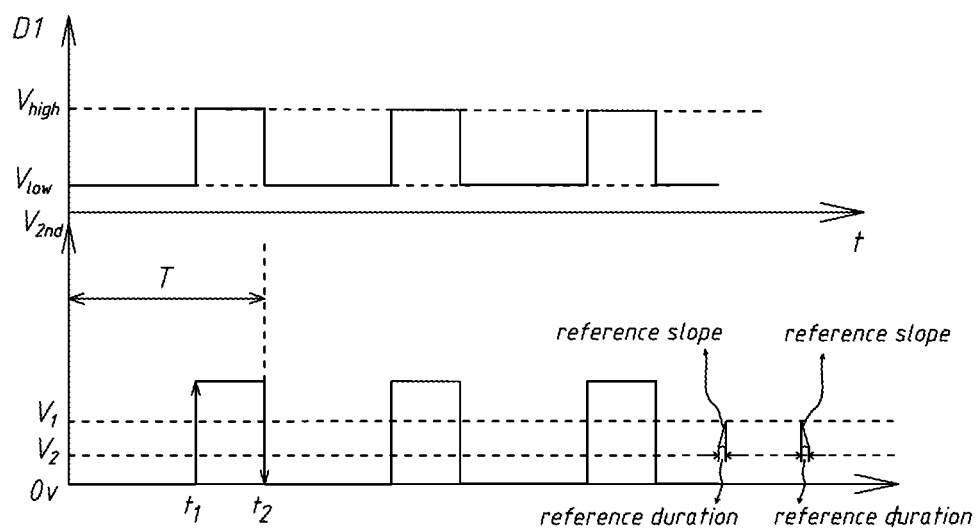
FIG. 4 is a schematic diagram illustrating waveforms of a detected voltage signal and the first digital signal in continuous conduction mode (CCM) according to the first embodiment of the present invention.
Figure 5:
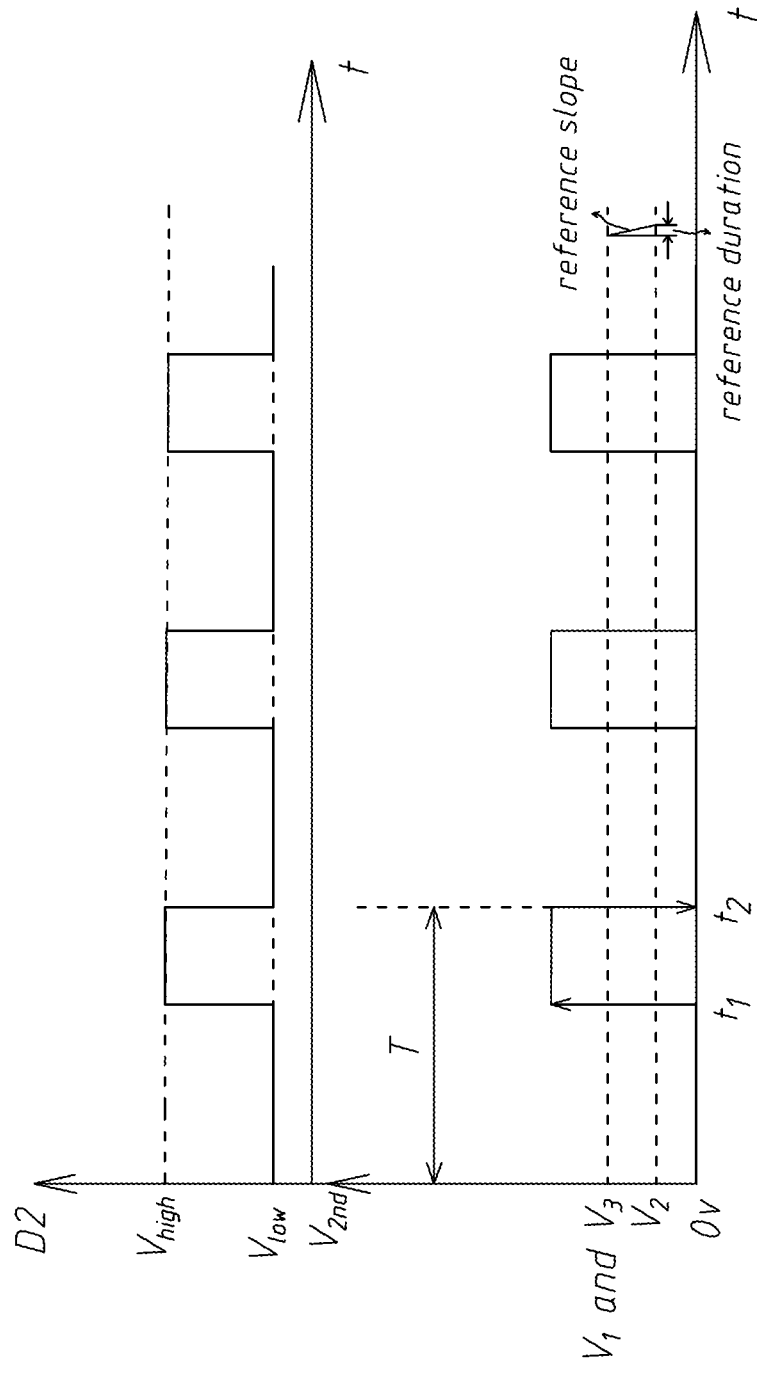
FIG. 5 is a schematic diagram illustrating waveforms of the detected voltage signal and the second digital signal in CCM according to the first embodiment of the present invention.
Figure 6:
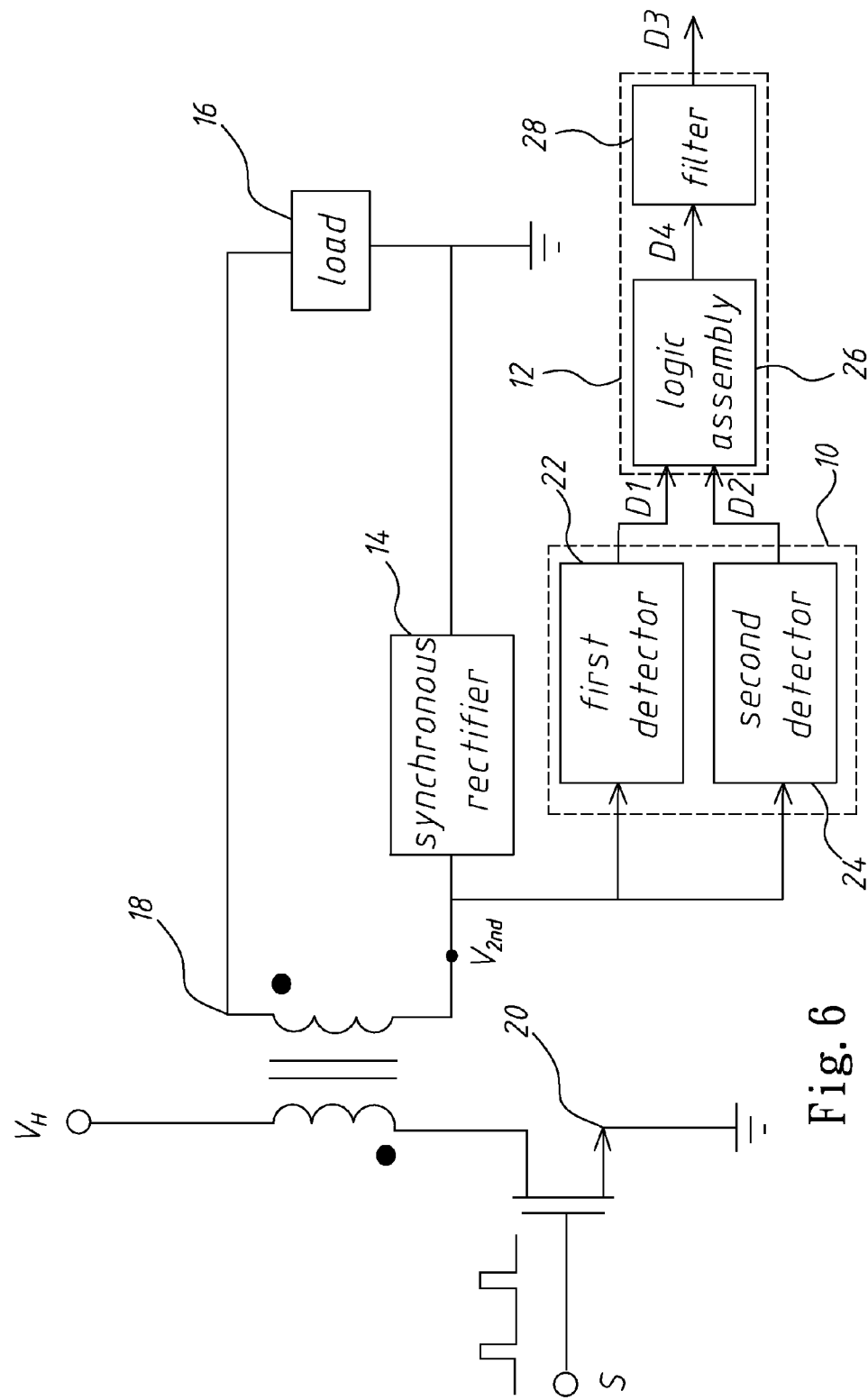
FIG. 6 is a schematic diagram illustrating a device for detecting conduction mode according to the second embodiment of the present invention.
Figure 7:
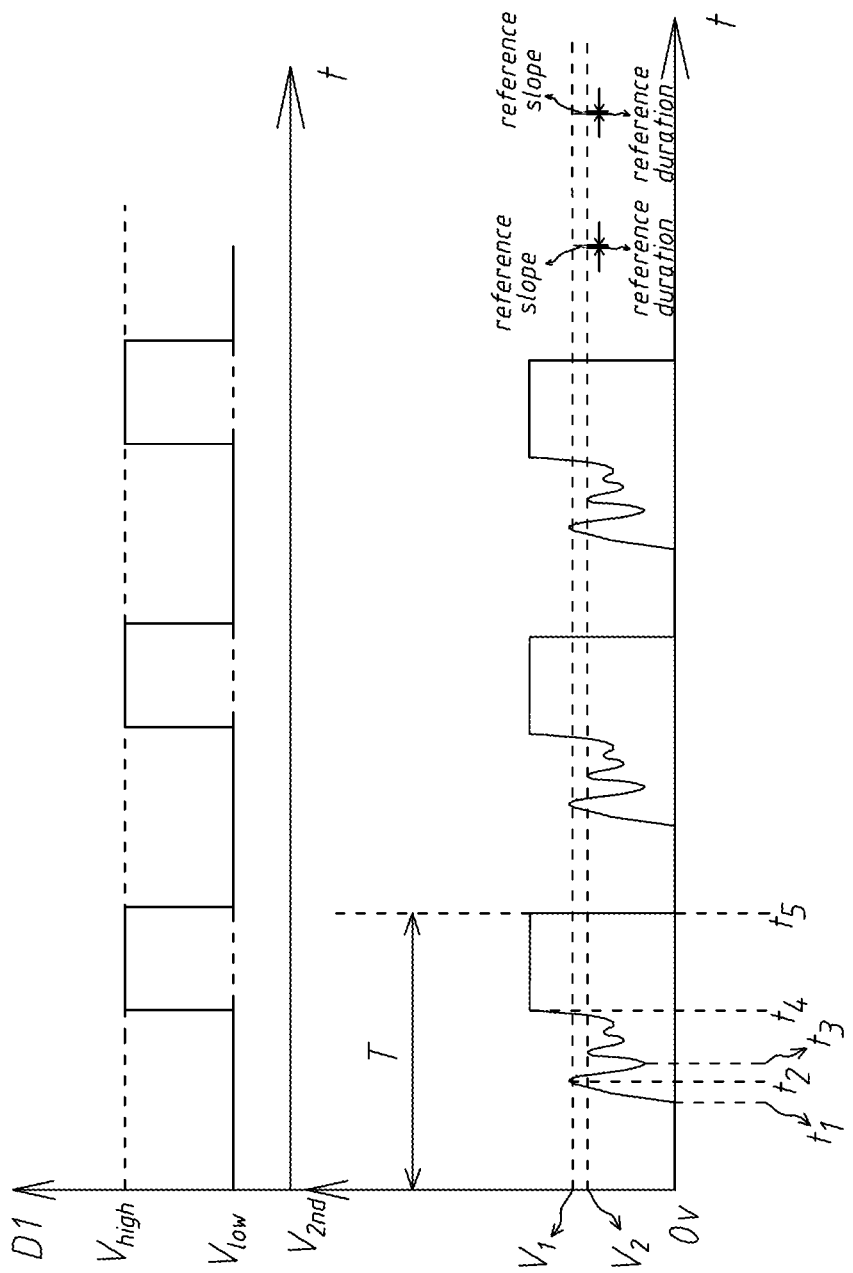
FIG. 7 is a schematic diagram illustrating waveforms of a detected voltage signal and the first digital signal in DCM according to the second embodiment of the present invention.
Figure 8:
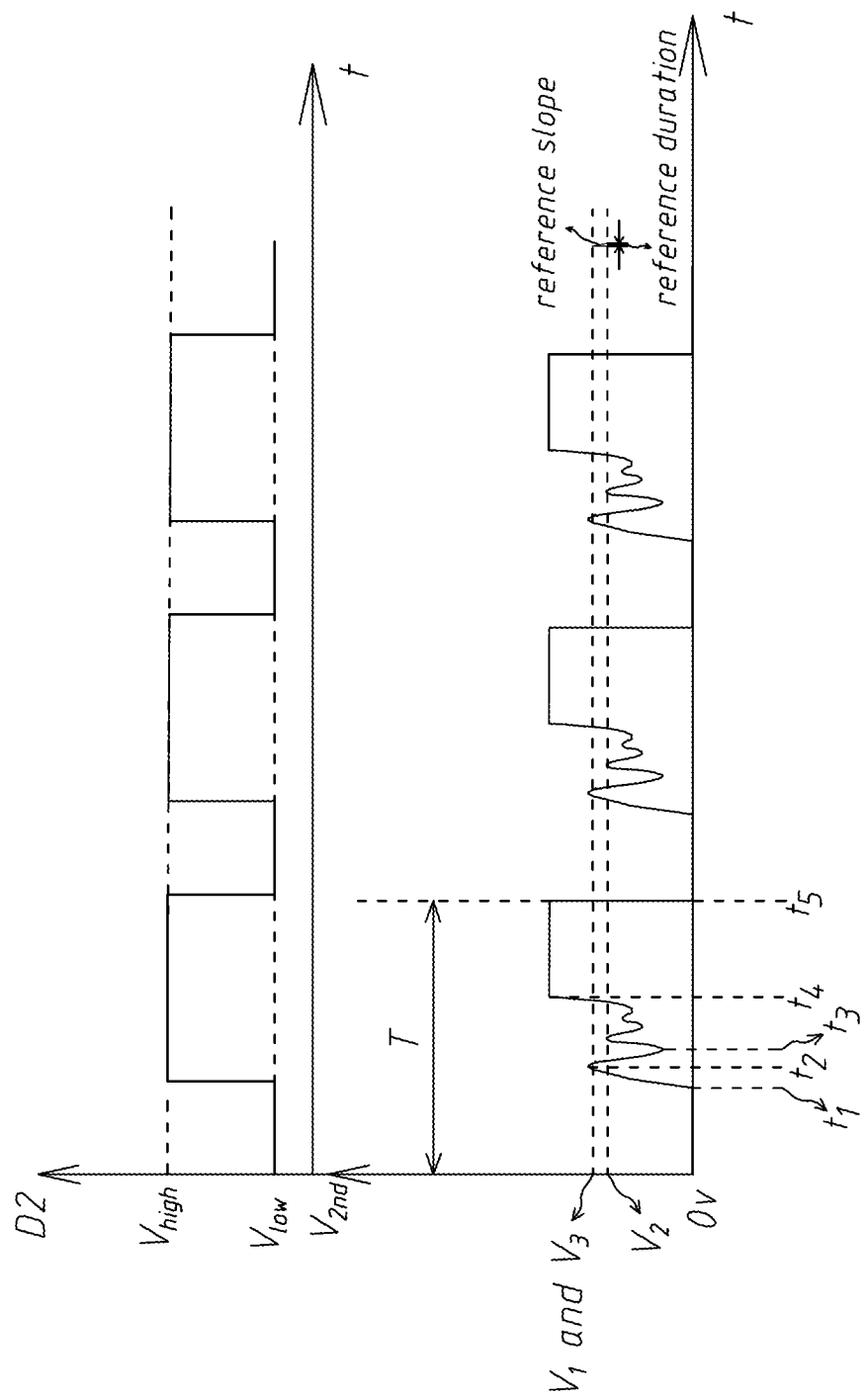
FIG. 8 is a schematic diagram illustrating waveforms of the detected voltage signal and the second digital signal in DCM according to the second embodiment of the present invention.
Figure 9:
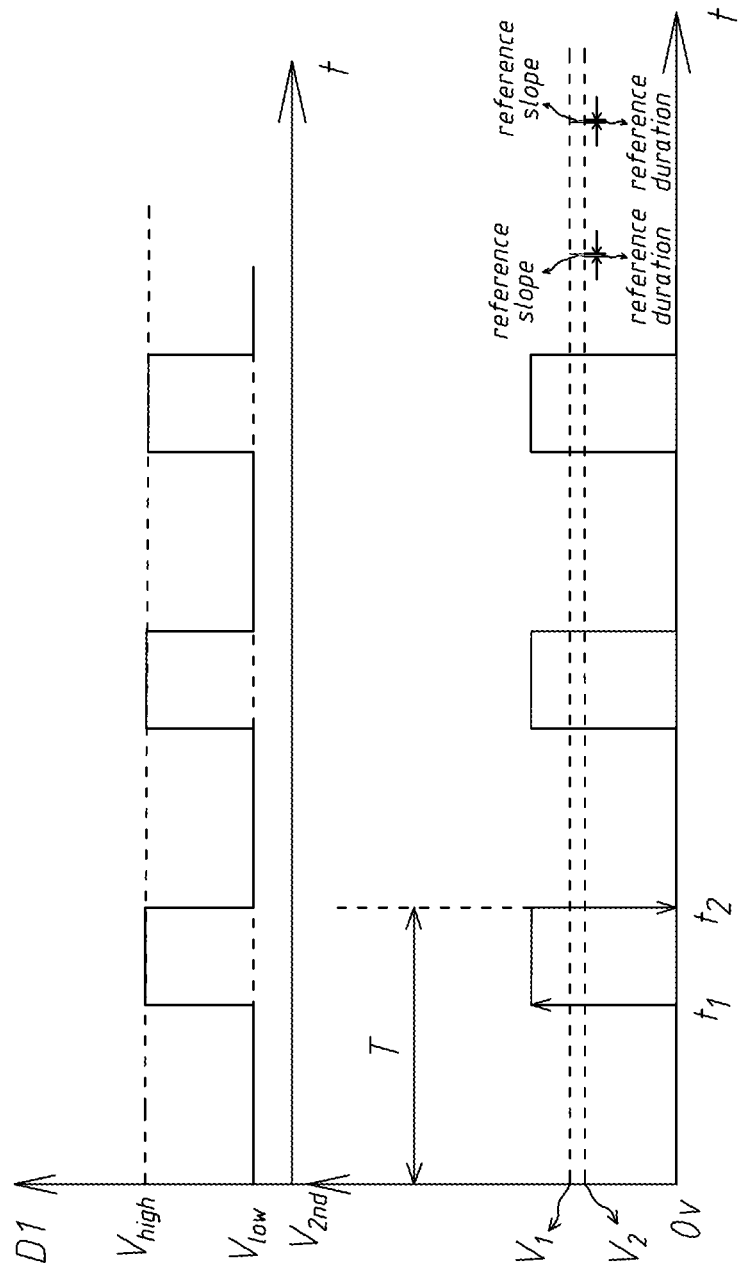
FIG. 9 is a schematic diagram illustrating waveforms of a detected voltage signal and the first digital signal in CCM according to the second embodiment of the present invention.
Figure 10:
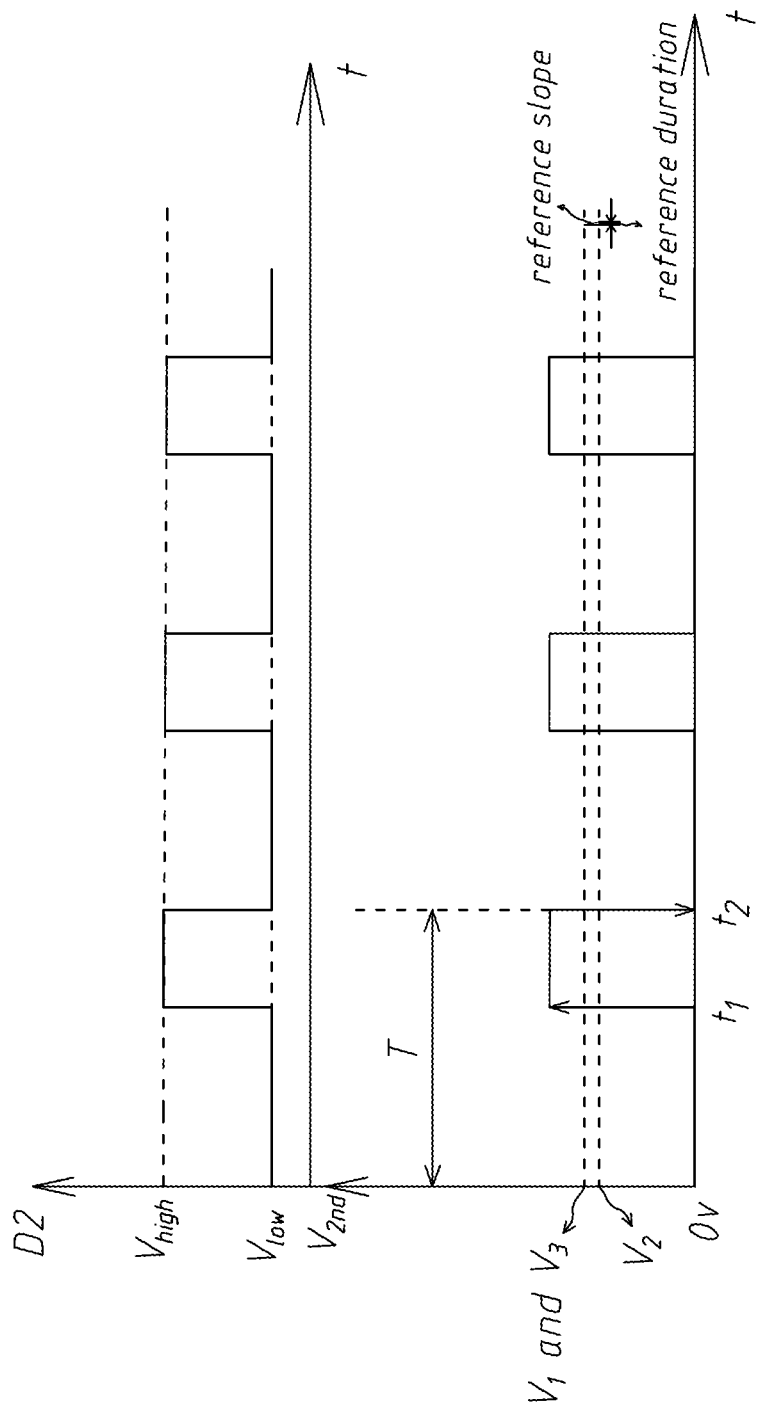
FIG. 10 is a schematic diagram illustrating waveforms of the detected voltage signal and the second digital signal in CCM according to the second embodiment of the present invention.
Figure 11:
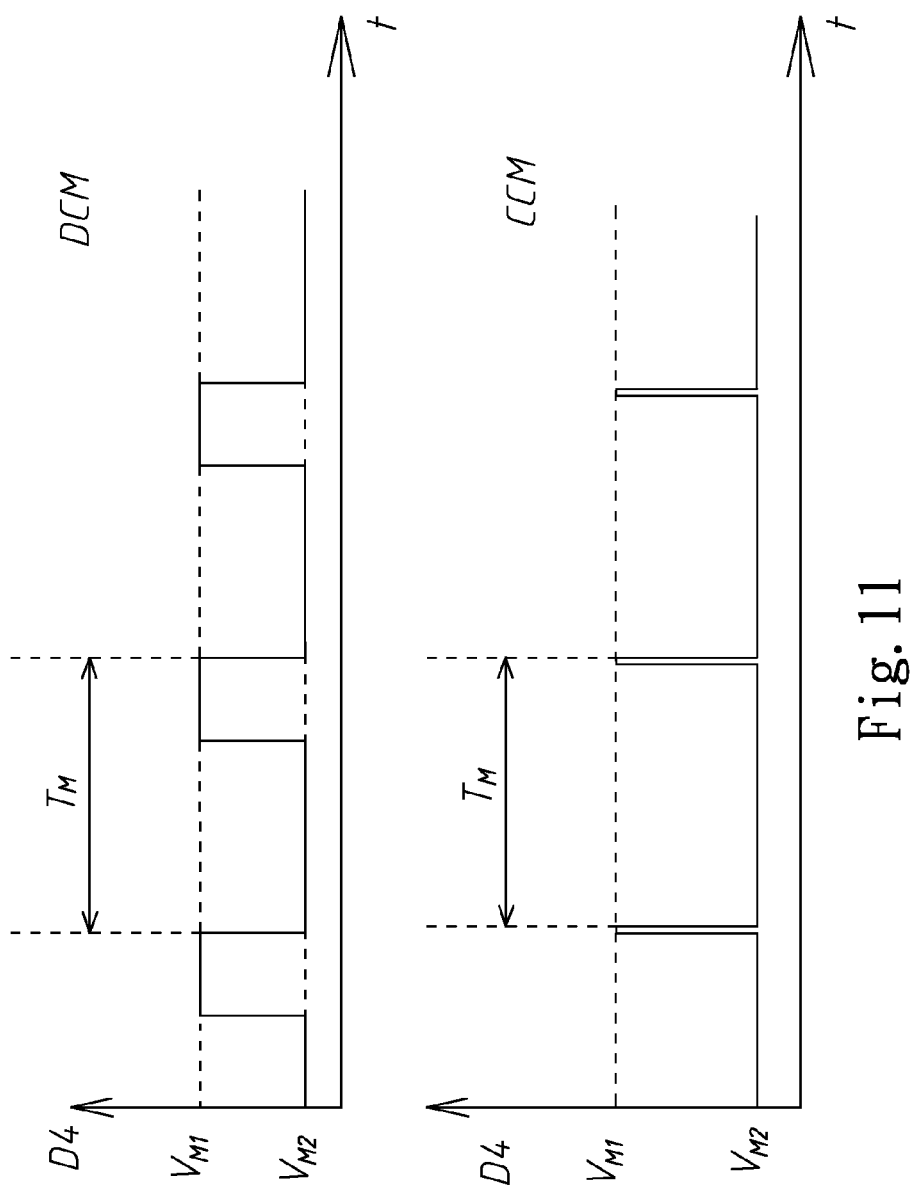
FIG. 11 is a schematic diagram illustrating waveforms of the fourth digital signals in DCM and CCM according to the second embodiment of the present invention.

The operation of the first embodiment is introduced as below. Firstly, the electrical switch 20 receives the square waveform S to switch a conduction state thereof, and the transformer 18 receives and stores the voltage $V_H$ as energy from the high-voltage terminal and discharges the energy from the secondary winding according to the conduction state, and the energy is applied to the load 16 through the synchronous rectifier 14, so as to periodically generate the detected voltage signal $V_{2nd}$ across the synchronous rectifier 14. The waveform of the detected voltage signal $V_{2nd}$ comprises at least one raising waveform, at least one horizontal waveform and at least one descending waveform appearing during a period T of the detected voltage signal $V_{2nd}$. When the transformer 18 operates in DCM, the waveform of the detected voltage signal $V_{2nd}$ is shown in the lower inset of FIG. 2 or FIG. 3. In FIG. 2 or FIG. 3, for example, the part of the detected voltage signal $V_{2nd}$ between t1 and t2 is the raising waveform, and the part of the detected voltage signal $V_{2nd}$ between t2 and t3 is the descending waveform, and the part of the detected voltage signal $V_{2nd}$ between t4 and t5 is the horizontal waveform. Certainly, there are the other raising waveforms, descending waveforms and horizontal waveforms during the period T. When the transformer 18 operates in CCM, the waveform of the detected voltage signal $V_{2nd}$ is shown in the lower inset of FIG. 4 or FIG. 5. In FIG. 4 or FIG. 5, for example, the instantaneously-raising part of the detected voltage signal $V_{2nd}$ at about t1 is the raising waveform, and the instantaneously-descending part of the detected voltage signal $V_{2nd}$ at about t2 is the descending waveform, and the part of the detected voltage signal $V_{2nd}$ between t1 and t2 is the horizontal waveform. Certainly, there are the other raising waveforms, descending waveforms and horizontal waveforms during the period T.

Then, the first and second detectors 22 and 24 receive the detected voltage signal $V_{2nd}$. The first detector 22 generates the first digital signal D1 according to the waveform of the detected voltage signal $V_{2nd}$, either of the reference duration or the reference slope, and the first and second voltages $V_1$ and $V_2$. The second detector 24 generates the second digital signal D2 according to the detected voltage signal $V_{2nd}$, either of the reference duration or the reference slope, and the first, second and third voltages $V_1$, $V_2$, and $V_3$.

For the first digital signal D1, the detected voltage signal $V_{2nd}$, the reference duration, and the first and second voltages $V_1$ and $V_2$ satisfy at least one of following relationships (a1)-(a3), a following relationship (a4) and at least one of following relationships (a5)-(a7):

(a1) When the raising waveform comprises the first and second voltages $V_1$ and $V_2$ and a time interval between two time points corresponding to the first and second voltages $V_1$ and $V_2$ in the raising waveform is less than the reference duration, the first digital signal D1 is a high level signal $V_{high}$ after the raising waveform appears. In other words, when the raising waveform comprises the first and second voltages $V_1$ and $V_2$ and the waveform slope of the raising waveform corresponding to the first and second voltages $V_1$ and $V_2$ is less than the reference slope, the first digital signal D1 is a high level signal $V_{high}$ after the raising waveform appears. For example, as shown in FIG. 4, the raising waveform at about t1 comprises the first and second voltages $V_1$ and $V_2$ and the time interval between two time points corresponding to the first and second voltages $V_1$ and $V_2$ in the raising waveform is less than the reference duration, thus the first digital signal D1 is the high level signal $V_{high}$ after the raising waveform appears.

(a2) When the raising waveform comprises the first and second voltages $V_1$ and $V_2$ and a time interval between two time points corresponding to the first and second voltages $V_1$ and $V_2$ in the raising waveform is not less than the reference duration, the first digital signal D1 keeps unchanged after the raising waveform appears. In other words, when the raising waveform comprises the first and second voltages $V_1$ and $V_2$ and the waveform slope of the raising waveform corresponding to the first and second voltages $V_1$ and $V_2$ is not less than the reference slope, the first digital signal D1 keeps unchanged after the raising waveform appears. For example, as shown in FIG. 2, the raising waveform between t1 and t2 comprises the first and second voltages $V_1$ and $V_2$ and the time interval between two time points corresponding to the first and second voltages $V_1$ and $V_2$ in the raising waveform is not less than the reference duration, thus the first digital signal D1 keeps unchanged after the raising waveform appears.

(a3) When the raising waveform does not comprise the first and second voltages $V_1$ and $V_2$, the first digital signal D1 keeps unchanged after the raising waveform appears.

(a4) The first digital signal D1 keeps unchanged after the horizontal waveform appears. For example, as shown in FIG. 2, the first digital signal D1 keeps unchanged after the horizontal waveform between t4 and t5 appears. Besides, as shown in FIG. 4, the first digital signal D1 keeps unchanged after the horizontal waveform between t1 and t2 appears.

(a5) When the descending waveform comprises the first and second voltages $V_1$ and $V_2$ and a time interval between two time points corresponding to the first and second voltages $V_1$ and $V_2$ in the descending waveform is less than the reference duration, the first digital signal D1 is a low level signal $V_{low}$ after the descending waveform appears. In other words, when the descending waveform comprises the first and second voltages $V_1$ and $V_2$ and the waveform slope of the descending waveform corresponding to the first and second voltages $V_1$ and $V_2$ is less than the reference slope, the first digital signal D1 is a low level signal $V_{low}$ after the descending waveform appears. For example, as shown in FIG. 2, the descending waveform at about t5 comprises the first and second voltages $V_1$ and $V_2$ and the time interval between two time points corresponding to the first and second voltages $V_1$ and $V_2$ in the descending waveform is less than the reference duration, thus the first digital signal D1 is the low level signal $V_{low}$ after the descending waveform appears. Besides, as shown in FIG. 4, the descending waveform at about t2 comprises the first and second voltages $V_1$ and $V_2$ and the time interval between two time points corresponding to the first and second voltages $V_1$ and $V_2$ in the descending waveform is less than the reference duration, thus the first digital signal D1 is the low level signal $V_{low}$ after the descending waveform appears.

(a6) When the descending waveform comprises the first and second voltages $V_1$ and $V_2$ and a time interval between two time points corresponding to the first and second voltages $V_1$ and $V_2$ in the descending waveform is not less than the reference duration, the first digital signal D1 keeps unchanged after the descending waveform appears. In other words, when the descending waveform comprises the first and second voltages $V_1$ and $V_2$ and the waveform slope of the descending waveform corresponding to the first and second voltages $V_1$ and $V_2$ is not less than the reference slope, the first digital signal D1 keeps unchanged after the descending waveform appears. For example, as shown in FIG. 2, the descending waveform between t2 and t3 comprises the first and second voltages $V_1$ and $V_2$ and the time interval between two time points corresponding to the first and second voltages $V_1$ and $V_2$ in the descending waveform is not less than the reference duration, thus the first digital signal D1 keeps unchanged after the descending waveform appears.

(a7) When the descending waveform does not comprise the first and second voltages $V_1$ and $V_2$, the first digital signal D1 keeps unchanged after the descending waveform appears.

For the second digital signal D2, the detected voltage signal $V_{2nd}$, the reference duration, and the first and second voltages $V_1$ and $V_2$ satisfy at least one of following relationships (b1)-(b3), a following relationship (b4) and at least one of following relationships (b5)-(b7):

(b1) When the raising waveform comprises the third voltage $V_3$ and the voltage of the raising waveform is larger than the third voltage $V_3$, the second digital signal D2 is a high level signal $V_{high}$ after the raising waveform appears. For example, as shown in FIG. 3, the raising waveform between t1 and t2 comprises the first voltage $V_1$ and the voltage of the raising waveform is larger than the first voltage $V_1$, thus the second digital signal D2 is the high level signal $V_{high}$ after the raising waveform appears. Besides, as shown in FIG. 5, the raising waveform at about t1 comprises the first voltage $V_1$ and the voltage of the raising waveform is larger than the first voltage $V_1$, thus the second digital signal D2 is the high level signal $V_{high}$ after the raising waveform appears.

(b2) When the raising waveform comprises the third voltage $V_3$ and the voltage of the raising waveform is not larger than the third voltage $V_3$, the second digital signal D2 keeps unchanged after the raising waveform appears.

(b3) When the raising waveform does not comprise the third voltage $V_3$, the second digital signal D2 keeps unchanged after the raising waveform appears.

(b4) The second digital signal D2 keeps unchanged after the horizontal waveform appears. For example, as shown in FIG. 3, the second digital signal D2 keeps unchanged after the horizontal waveform between t4 and t5 appears. Besides, as shown in FIG. 4, the second digital signal D2 keeps unchanged after the horizontal waveform between t1 and t2 appears.

(b5) When the descending waveform comprises the first and second voltages $V_1$ and $V_2$ and the time interval between two time points corresponding to the first and second voltages $V_1$ and $V_2$ in the descending waveform is less than the reference duration, the second digital signal D2 is a low level signal $V_{low}$ after the descending waveform appears. In other words, when the descending waveform comprises the first and second voltages $V_1$ and $V_2$ and the waveform slope of the descending waveform corresponding to the first and second voltages $V_1$ and $V_2$ is less than the reference slope, the second digital signal D2 is a low level signal $V_{low}$ after the descending waveform appears. For example, as shown in FIG. 3, the descending waveform at about t5 comprises the first and second voltages $V_1$ and $V_2$ and the time interval between two time points corresponding to the first and second voltages $V_1$ and $V_2$ in the descending waveform is less than the reference duration, thus the second digital signal D2 is the low level signal $V_{low}$ after the descending waveform appears. Besides, as shown in FIG. 5, the descending waveform at about t2 comprises the first and second voltages $V_1$ and $V_2$ and the time interval between two time points corresponding to the first and second voltages $V_1$ and $V_2$ in the descending waveform is less than the reference duration, thus the second digital signal D2 is the low level signal $V_{low}$ after the descending waveform appears.

(b6) When the descending waveform comprises the first and second voltages $V_1$ and $V_2$ and the time interval between two time points corresponding to the first and second voltages $V_1$ and $V_2$ in the descending waveform is not less than the reference duration, the second digital signal D2 keeps unchanged after the descending waveform appears. In other words, when the descending waveform comprises the first and second voltages $V_1$ and $V_2$ and the waveform slope of the descending waveform corresponding to the first and second voltages $V_1$ and $V_2$ is not less than the reference slope, the second digital signal D2 keeps unchanged after the descending waveform appears. For example, as shown in FIG. 3, the descending waveform between t2 and t3 comprises the first and second voltages $V_1$ and $V_2$ and the time interval between two time points corresponding to the first and second voltages $V_1$ and $V_2$ in the descending waveform is not less than the reference duration, thus the second digital signal D2 keeps unchanged after the descending waveform appears.

(b7) When the descending waveform does not comprise the first and second voltages $V_1$ and $V_2$, the second digital signal D2 keeps unchanged after the descending waveform appears.

Finally, the digital processor 12 receives the first and second digital signals D1 and D2, and generates the third digital signal D3 according to the first and second digital signals D1 and D2, so as to determine that the transformer 18 operates in CCM or DCM. In the first embodiment, the digital processor 12 is realized with a XOR gate. As a result, when the transformer 18 operates in CCM, the third digital signal D3 is a single level digital signal. When the transformer 18 operates in DCM, the third digital signal D3 has two different voltage levels or an inverse single level digital signal of CCM.

The operation of the analog processor 10 and the digital processor 12 is also performed in a step. In the step, the device 8 for detecting conduction mode receives the detected voltage signal $V_{2nd}$ and generates the third digital signal D3 according to the detected voltage signal $V_{2nd}$, either of the reference duration or the reference slope, and the first, second and third voltages $V_1$, $V_2$ and $V_3$, so as to determine that the transformer 18 operates in CCM or DCM.

Refer to FIG. 6, FIG. 7, FIG. 8, FIG. 9, FIG. 10 and FIG. 11, and the second embodiment of the present invention is introduced as below. The second embodiment is different from the first embodiment in the digital processor 12. In the second embodiment, the digital processor 12 comprises a logic assembly 26 and a filter 28, and the logic assembly 26 is exemplified by a XOR gate. The logic assembly 26 connects with the analog processor 10, receives the first and second digital signals D1 and D2 and generates a fourth digital signal D4 according to the first and second digital signals D1 and D2. The fourth digital signal D4 has a period $T_M$, a first voltage level $V_{M1}$ and a second voltage level $V_{M2}$ different from the first voltage level $V_{M1}$. The first and second voltage levels $V_{M1}$ and $V_{M2}$ respectively occupy a first duration and a second duration in the period $T_M$ of the fourth digital signal D4. The filter 28 connects with the logic assembly 26 and receives the fourth digital signal D4. The filter 28 filters out the first voltage level $V_{M1}$ to generate the third digital signal D3 when a ratio of the first duration to the period $T_M$ of the fourth digital signal D4 is less than a given value such as 1% or 2%. The filter 28 passes the fourth digital signal D4 as the third digital signal D3 when the ratio is larger than or equal to the given value.

The operation of the second embodiment is introduced as below. The operation of the electrical switch 20, the transformer 18, the synchronous rectifier 14, the load 16 and the analog processor 10 is the same to that of the first embodiment so will not be reiterated. However, the first and second voltages $V_1$ and $V_2$ of the first embodiment are different from those of the second embodiment. As a result, the first digital signal D1 in DCM of the second embodiment is different from that of the first embodiment, and there is a little delay between the first and second digital signals D1 and D2 in CCM of the second embodiment. Thus, the logic assembly 26 then receives the first and second digital signals D1 and D2 and generates the fourth digital signal D4 according to the first and second digital signals D1 and D2, wherein the fourth digital signal D4 in CCM has a plurality of positive pulses. Finally, the filter 28 receives the fourth digital signal D4 and determines whether the ratio of the first duration to the period $T_M$ of the fourth digital signal D4 is less than the given value. If the answer is yes, the filter 28 filters out the first voltage level $V_{M1}$ to generate the third digital signal D3. If the answer is no, the filter 28 passes the fourth digital signal D4 as the third digital signal D3.

In conclusion, the method and the device of the present invention can precisely determine that the energy-storing element operates in CCM or DCM.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A method for detecting conduction mode, which uses an energy-storing element to connect with a synchronous rectifier and a load, and said load connects with said synchronous rectifier;
said method comprising steps of:
energy is discharged from said energy-storing element and applied to said load through said synchronous rectifier, so as to periodically generate a detected voltage signal across said synchronous rectifier, and waveform of said detected voltage signal comprises at least one raising waveform, at least one horizontal waveform and at least one descending waveform appearing during a period of said detected voltage signal, voltage of said detected voltage signal further comprises a first voltage, a second voltage and a third voltage between a maximum voltage and a minimum voltage of said detected voltage signal, and said second voltage is less than said first voltage;
generating first and second digital signals according to said waveform of said detected voltage signal, a reference slope, and said first, second and third voltages;
receiving said first and second digital signals and generating a fourth digital signal according to said first and second digital signals, and said fourth digital signal has a period, a first voltage level and a second voltage level different from said first voltage level, and said first and second voltage levels respectively occupy a first duration and a second duration in said period of said fourth digital signal; and
receiving said fourth digital signal, determining whether a ratio of said first duration to said period of said fourth digital signal is less than a given value and using said fourth digital signal to generate a third digital signal, so as to determine that said energy-storing element operates in continuous conduction mode (CCM) or discontinuous conduction mode (DCM);
if yes, filtering out said first voltage level to generate said third digital signal; and
if no, passing said fourth digital signal as said third digital signal.

2. A method for detecting conduction mode, which uses an energy-storing element to connect with a synchronous rectifier and a load, and said load connects with said synchronous rectifier;
said method comprising steps of:
energy is discharged from said energy-storing element and applied to said load through said synchronous rectifier, so as to periodically generate a detected voltage signal across said synchronous rectifier, and waveform of said detected voltage signal comprises at least one raising waveform, at least one horizontal waveform and at least one descending waveform appearing during a period of said detected voltage signal, voltage of said detected voltage signal further comprises a first voltage, a second voltage, and a third voltage between a maximum voltage and a minimum voltage of said detected voltage signal, and said second voltage is less than said first voltage;
generating first and second digital signals according to said waveform of said detected voltage signal, a reference duration, and said first, second and third voltages;
receiving said first and second digital signals and generating a fourth digital signal according to said first and second digital signals, and said fourth digital signal has a period, a first voltage level and a second voltage level different from said first voltage level, and said first and second voltage levels respectively occupy a first duration and a second duration in said period of said fourth digital signal; and
receiving said fourth digital signal, determining whether a ratio of said first duration to said period of said fourth digital signal is less than a given value and using said fourth digital signal to generate a third digital signal, so as to determine that said energy-storing element operates in continuous conduction mode (CCM) or discontinuous conduction mode (DCM);
if yes, filtering out said first voltage level to generate said third digital signal; and
if no, passing said fourth digital signal as said third digital signal.

3. The method for detecting conduction mode according to claim 2, wherein said detected voltage signal, said reference duration, said first voltage and said second voltage satisfy at least one of following relationships (a1)-(a3), a following relationship (a4) and at least one of following relationships (a5)-(a7):

(a1) when said raising waveform comprises said first and second voltages and a time interval between two time points corresponding to said first and second voltages in said raising waveform is less than said reference duration, said first digital signal is a high level signal after said raising waveform appears;

(a2) when said raising waveform comprises said first and second voltages and a time interval between two time points corresponding to said first and second voltages in said raising waveform is not less than said reference duration, said first digital signal keeps unchanged after said raising waveform appears;

(a3) when said raising waveform does not comprise said first and second voltages, said first digital signal keeps unchanged after said raising waveform appears;

(a4) said first digital signal keeps unchanged after said horizontal waveform appears;

(a5) when said descending waveform comprises said first and second voltages and a time interval between two time points corresponding to said first and second voltages in said descending waveform is less than said reference duration, said first digital signal is a low level signal after said descending waveform appears;

(a6) when said descending waveform comprises said first and second voltages and a time interval between two time points corresponding to said first and second voltages in said descending waveform is not less than said reference duration, said first digital signal keeps unchanged after said descending waveform appears; and (a7) when said descending waveform does not comprise said first and second voltages, said first digital signal keeps unchanged after said descending waveform appears.

4. The method for detecting conduction mode according to claim 2, wherein said detected voltage signal, said reference duration, said first voltage, said second voltage and said third voltage satisfy at least one of following relationships (b1)-(b3), a following relationship (b4) and at least one of following relationships (b5)-(b7):

(b1) when said raising waveform comprises said third voltage and a voltage of said raising waveform is larger than said third voltage, said second digital signal is a high level signal after said raising waveform appears;

(b2) when said raising waveform comprises said third voltage and a voltage of said raising waveform is not larger than said third voltage, said second digital signal keeps unchanged after said raising waveform appears;

(b3) when said raising waveform does not comprise said third voltage, said second digital signal keeps unchanged after said raising waveform appears;

(b4) said second digital signal keeps unchanged after said horizontal waveform appears;

(b5) when said descending waveform comprises said first and second voltages and a time interval between two time points corresponding to said first and second voltages in said descending waveform is less than said reference duration, said second digital signal is a low level signal after said descending waveform appears;

(b6) when said descending waveform comprises said first and second voltages and a time interval between two time points corresponding to said first and second voltages in said descending waveform is not less than said reference duration, said second digital signal keeps unchanged after said descending waveform appears; and (b7) when said descending waveform does not comprise said first and second voltages, said second digital signal keeps unchanged after said descending waveform appears.

5. The method for detecting conduction mode according to claim 2, wherein when said energy-storing element operates in said CCM, said third digital signal is a single level digital signal; and when said energy-storing element operates in said DCM, said third digital signal has two different voltage levels or inverse said single level digital signal.

6. The method for detecting conduction mode according to claim 2, wherein said energy-storing element is a transformer, and a secondary winding of said transformer connects with said synchronous rectifier, and an end of a primary winding of said transformer connects with a high-voltage terminal, and another end of said primary winding connects with a low-voltage terminal via an electrical switch, and in said step of said energy discharged from said secondary winding, said electrical switch receives a square waveform to switch a conduction state thereof, and said transformer receives and stores a voltage as said energy from said high-voltage terminal and discharges said energy from said secondary winding according to said conduction state.

7. The method for detecting conduction mode according to claim 2, wherein said transformer is installed in a switching power supply.

8. A device for detecting conduction mode, which connects with a synchronous rectifier, and said synchronous rectifier and a load connect with an energy-storing element, and said load connects with said synchronous rectifier, and energy is discharged from said energy-storing element and applied to said load through said synchronous rectifier, so as to periodically generate a detected voltage signal across said synchronous rectifier, and waveform of said detected voltage signal comprises at least one raising waveform, at least one horizontal waveform and at least one descending waveform appearing during a period of said detected voltage signal, and voltage of said detected voltage signal further comprises a first voltage, a second voltage and a third voltage between a maximum voltage and a minimum voltage of said detected voltage signal, and said second voltage is less than said first voltage, said device for detecting conduction mode comprising:

an analog processor connecting with said synchronous rectifier, receiving said detected voltage signal, and generating first and second digital signals according to said waveform of said detected voltage signal, a reference slope, and said first, second and third voltages;

a logic assembly connecting with said analog processor, receiving said first and second digital signals and generating a fourth digital signal according to said first and second digital signals, and said fourth digital signal has a period, a first voltage level and a second voltage level different from said first voltage level, and said first and second voltage levels respectively occupy a first duration and a second duration in said period of said fourth digital signal; and a filter connecting with said logic assembly, receiving said fourth digital signal and using said fourth digital signal to generate a third digital signal, so as to determine that said energy-storing element operates in continuous conduction mode (CCM) or discontinuous conduction mode (DCM), and said filter filters out said first voltage level to generate said third digital signal when a ratio of said first duration to said period of said fourth digital signal is less than a given value, and said filter passes said fourth digital signal as said third digital signal when said ratio is larger than or equal to said given value.

9. A device for detecting conduction mode, which connects with a synchronous rectifier, and said synchronous rectifier and a load connect with an energy-storing element, and said load connects with said synchronous rectifier, and energy is discharged from said energy-storing element and applied to said load through said synchronous rectifier, so as to periodically generate a detected voltage signal across said synchronous rectifier, and waveform of said detected voltage signal comprises at least one raising waveform, at least one horizontal waveform and at least one descending waveform appearing during a period of said detected voltage signal, and voltage of said detected voltage signal further comprises a first voltage, a second voltage and a third voltage between a maximum voltage and a minimum voltage of said detected voltage signal, and said second voltage is less than said first voltage, said device for detecting conduction mode comprising:

an analog processor connecting with said synchronous rectifier, receiving said detected voltage signal, and generating first and second digital signals according to said waveform of said detected voltage signal, a reference duration, and said first, second and third voltages;

a logic assembly connecting with said analog processor, receiving said first and second digital signals and generating a fourth digital signal according to said first and second digital signals, and said fourth digital signal has a period, a first voltage level and a second voltage level different from said first voltage level, and said first and second voltage levels respectively occupy a first duration and a second duration in said period of said fourth digital signal; and a filter connecting with said logic assembly, receiving said fourth digital signal and using said fourth digital signal to generate a third digital signal, so as to determine that said energy-storing element operates in continuous conduction mode (CCM) or discontinuous conduction mode (DCM), and said filter filters out said first voltage level to generate said third digital signal when a ratio of said first duration to said period of said fourth digital signal is less than a given value, and said filter passes said fourth digital signal as said third digital signal when said ratio is larger than or equal to said given value.

10. The device for detecting conduction mode according to claim 9, wherein said analog processor uses said detected voltage signal, said reference duration, said first voltage and said second voltage to satisfy at least one of following relationships (a1)-(a3), a following relationship (a4) and at least one of following relationships (a5)-(a7):

(a1) when said raising waveform comprises said first and second voltages and a time interval between two time points corresponding to said first and second voltages in said raising waveform is less than said reference duration, said first digital signal is a high level signal after said raising waveform appears;

(a2) when said raising waveform comprises said first and second voltages and a time interval between two time points corresponding to said first and second voltages in said raising waveform is not less than said reference duration, said first digital signal keeps unchanged after said raising waveform appears;

(a3) when said raising waveform does not comprise said first and second voltages, said first digital signal keeps unchanged after said raising waveform appears;

(a4) said first digital signal keeps unchanged after said horizontal waveform appears;

(a5) when said descending waveform comprises said first and second voltages and a time interval between two time points corresponding to said first and second voltages in said descending waveform is less than said reference duration, said first digital signal is a low level signal after said descending waveform appears;

(a6) when said descending waveform comprises said first and second voltages and a time interval between two time points corresponding to said first and second voltages in said descending waveform is not less than said reference duration, said first digital signal keeps unchanged after said descending waveform appears; and (a7) when said descending waveform does not comprise said first and second voltages, said first digital signal keeps unchanged after said descending waveform appears.

11. The device for detecting conduction mode according to claim 9, wherein said analog processor uses said detected voltage signal, said reference duration, said first voltage, said second voltage and said third voltage to satisfy at least one of following relationships (b1)-(b3), a following relationship (b4) and at least one of following relationships (b5)-(b7):

(b1) when said raising waveform comprises said third voltage and a voltage of said raising waveform is larger than said third voltage, said second digital signal is a high level signal after said raising waveform appears;

(b2) when said raising waveform comprises said third voltage and a voltage of said raising waveform is not larger than said third voltage, said second digital signal keeps unchanged after said raising waveform appears;

(b3) when said raising waveform does not comprise said third voltage, said second digital signal keeps unchanged after said raising waveform appears;

(b4) said second digital signal keeps unchanged after said horizontal waveform appears;

(b5) when said descending waveform comprises said first and second voltages and a time interval between two time points corresponding to said first and second voltages in said descending waveform is less than said reference duration, said second digital signal is a low level signal after said descending waveform appears;

(b6) when said descending waveform comprises said first and second voltages and a time interval between two time points corresponding to said first and second voltages in said descending waveform is not less than said reference duration, said second digital signal keeps unchanged after said descending waveform appears; and (b7) when said descending waveform does not comprise said first and second voltages, said second digital signal keeps unchanged after said descending waveform appears.

12. The device for detecting conduction mode according to claim 9, wherein when said energy-storing element operates in said CCM, said third digital signal is a single level digital signal; and when said energy-storing element operates in said DCM, said third digital signal has two different voltage levels or inverse said single level digital signal.

13. The device for detecting conduction mode according to claim 9, wherein said energy-storing element is a transformer, and a secondary winding of said transformer connects with said synchronous rectifier, and an end of a primary winding of said transformer connects with a high-voltage terminal, and another end of said primary winding connects with a low-voltage terminal via an electrical switch, and said electrical switch receives a square waveform to switch a conduction state thereof, and said transformer receives and stores a voltage as said energy from said high-voltage terminal and discharges said energy from said secondary winding according to said conduction state.

14. The device for detecting conduction mode according to claim 13, wherein said electrical switch is an N-channel metal oxide semiconductor field effect transistor (NMOS-FET).

15. The device for detecting conduction mode according to claim 9, wherein said transformer is installed in a switching power supply.

16. The device for detecting conduction mode according to claim 9, wherein said synchronous rectifier is a diode or an N-channel metal oxide semiconductor field effect transistor (NMOSFET).

17. The device for detecting conduction mode according to claim 9, wherein said analog processor further comprising:

a first detector connecting with said synchronous rectifier and said digital processor, receiving said detected voltage signal, and generating said first digital signal according to said waveform of said detected voltage signal, said reference duration, said first voltage and said second voltage; and a second detector connecting with said synchronous rectifier and said digital processor, receiving said detected voltage signal, and generating said second digital signal according to said waveform of said detected voltage signal, said reference duration and said first, second and third voltages.

18. The device for detecting conduction mode according to claim 9, wherein said digital processor is a logic assembly.

19. The device for detecting conduction mode according to claim 18, wherein said logic assembly is a XOR gate.

* * * * *